United States Patent Office 3,546,774
Patented Dec. 15, 1970

3,546,774
MACHINE TOOL
Theodor Stöferle, Ludwigsburg, Horst Hölzl, Oppenweiler, and Max Rosskopf, Marbach (Neckar), Germany, assignors to Karl Huller G.m.b.H., Ludwigsburg, Wurttemburg, Germany
Filed Apr. 1, 1968, Ser. No. 717,720
Claims priority, application Germany, Mar. 30, 1967,
H 62,301
Int. Cl. B23q *3/157*
U.S. Cl. 29—568          27 Claims

ABSTRACT OF THE DISCLOSURE

A machine tool for treatment of limited numbers of bulky workpieces which comprises a platform for several universal work tables, a frame having a base adjacent to the platform and a column reciprocable along the base lengthwise of the platform, a slide reciprocable on the column up and down, a carriage reciprocable on the slide in a horizontal direction at right angles to the direction of movement of the column, a turret with two parallel tool spindles mounted on the carriage for rotation about a horizontal axis, a tool magazine coupled to the column for movement along the base, and a transfer mechanism which transports tools between the tool spindles and the magazine. The transfer mechanism has a first mobile unit which is mounted on the magazine and serves to withdraw tools from or to insert tools into the magazine and a second mobile unit mounted on the slide and serving to transport tools between the first unit and the tool spindles.

BACKGROUND OF THE INVENTION

The present invention relates to machine tools in general, and more particularly to improvements in machine tools which are especially suited for limited production of bulky workpieces such as blocks and cylinder heads for engines of watercraft, housings or casings for stationary generators or like aggregates, and many others.

Very bulky workpieces, as exemplified by engine blocks of large watercraft, cannot be treated in machine tools which are designed for mass-production of relatively small, compact and lightweight articles. As a rule, such bulky workpieces are produced singly or in short series by resorting to specially built assemblies of machine tools which are manipulated by hand and serve to perform various drilling, boring and milling operations. The cost of workpieces which are produced in such assemblies of special machine tools is very high, mainly due to the number of man hours spent for setup, adjustment of individual machine tools and transfer of workpieces from one machine tool to another.

SUMMARY OF THE INVENTION

It is an object of our invention to provide a novel and improved machine tool which is sufficiently versatile to subject bulky workpieces to a variety of treatments, which can be operated automatically, which can be set up or its setting changed with little loss in time, and which can be utilized for precision treatment of a wide variety of workpieces, either singly or in series of two or more.

Another object of the invention is to provide a machine tool wherein a bulky workpiece can be prepared for a series of treatments or removed from its support while another workpiece undergoes one or more treatments.

A further object of the invention is to provide a novel combination boring or drilling and milling machine for treatment of small numbers of bulky workpieces.

An additional object of the invention is to provide the machine with novel tool accommodating, transferring, rotating and transporting assemblies.

The improved machine tool constitutes a combined milling and boring machine which is particularly suited for removing material from and/or for other treatment of bulky workpieces and comprises stationary work supporting means which preferably constitutes a self-sustaining assembly and may include an elongated floor-supported platform for several longitudinally spaced tiltable and/or otherwise adjustable work supporting tables, a frame having a lower portion adjacent to the platform of the work supporting means and an upper portion supported by the lower portion for reciprocatory movement in a first direction which is preferably horizontal so that the upper portion may be placed adjacent to a selected table on the platform, a main slide mounted on the upper portion of the frame for reciprocatory movement in a second direction (preferably vertically) which is normal to the first direction, a carriage supported by the main slide for reciprocatory movement in a third direction (preferably horizontally) which is normal to the first and second directions, a turret mounted on the carriage and being turnable about a predetermined axis which is preferably parallel to the first direction, a plurality of tool spindles rotatably mounted in the turret, a tool magazine mounted on the lower portion of the frame and coupled to the upper portion of the frame for movement therewith in the first direction, and a transfer mechanism having a first mobile unit mounted on the magazine and provided with gripper means for inserting tools into or for withdrawing tools from the magazine and a second mobile unit mounted on the main slide and having clamping means for transporting tools between the gripper means and the tool spindles on the turret.

The novel features which are considered as characteristic of the invention are set forth in particular in the appended claims. The improved machine tool itself, however, both as to its construction and its mode of operations, together with additional features and advantages thereof, will be best understood upon perusal of the following detailed description of a specific embodiment with reference to the accompanying drawing.

DESCRIPTION OF THE PREFERRED EMBODIMENTS

Figure 1:
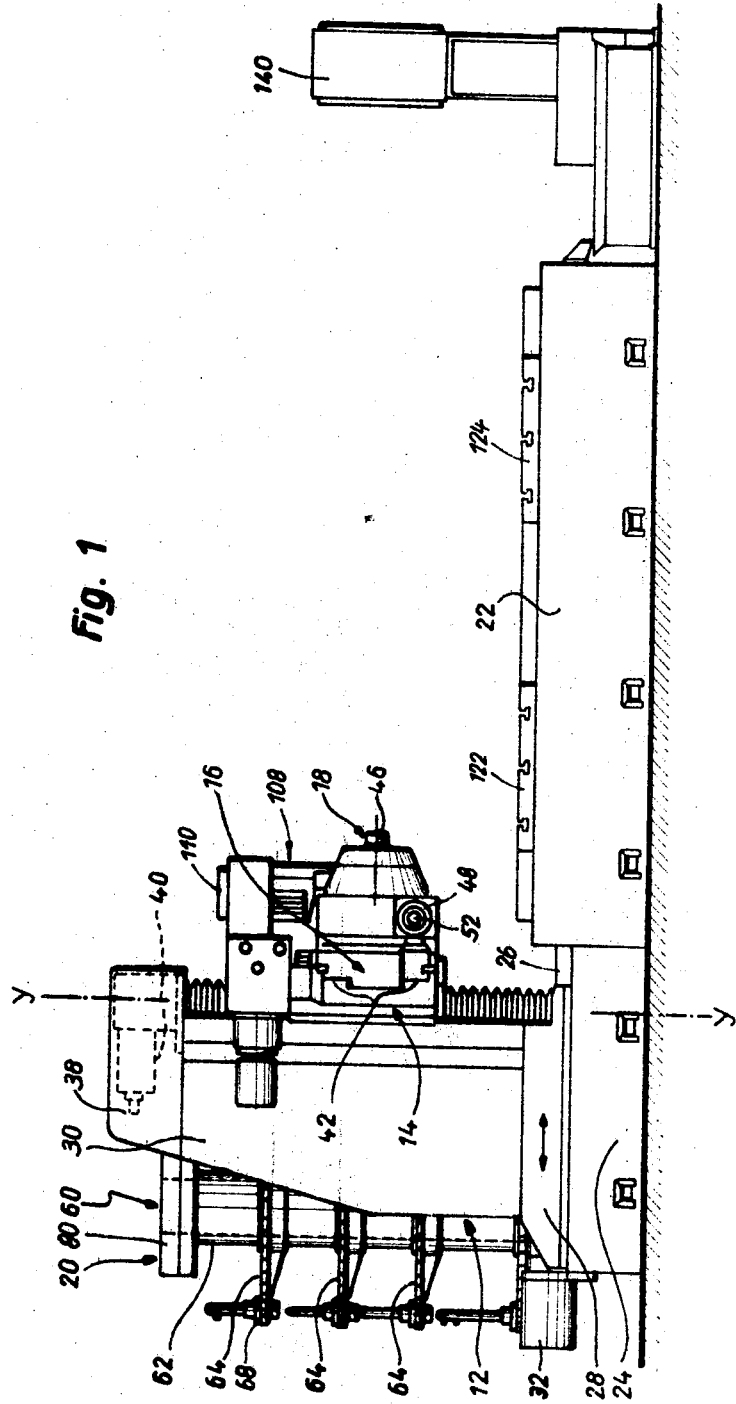
FIG. 1 is a side elevational view of a machine tool which embodies our invention.

Referring first to FIGS. 1 to 4, the improved machine tool comprises a frame including a base portion or bed 10 which includes a plate-like table 24 with guides 26 spaced from each other and mounted on the table 24. The frame further includes a movable second portion or column 12 having a lower part or section 28 which is movable along the guides 26 in the longitudinal direction X—X of the bed 10. The upper part or section 30 of the column 12 is mounted on the lower section 28. The drive for moving the column 12 along the guides 26 comprises a reversible motor 32 mounted at one end of the table 24 and arranged to rotate a feed screw 34 which meshes with one or more spindle nuts (not shown) provided in or on the lower section 28. The feed screw 34 is parallel to the direction (X—X) of reciprocatory movement of the column 12.

The front face of the upper section 30 of the column 12 is provided with vertical ways 36 (FIG. 3) which guide a main slide 14 for reciprocatory movement in a direction (Y—Y) which is normal to the direction of movement (X—X) of the column 12. The top portion or cap 38 of the section 30 accommodates the motor 40 of a second drive which can move the slide 14 up or down along the ways 36. The motor 40 drives a feed screw (not shown) which meshes with one or more spindle nuts provided on the slide 14.

The front face of the slide 14 is provided with horizontal ways 42 which guide a carriage 16 for reciprocatory movement in a horizontal direction (Z—Z) which is normal to the directions X—X and Y—Y. The drive for the carriage 16 comprises a motor 44 (FIG. 3) which can rotate a spindle (not shown) meshing with one or more spindle nuts in or on the carriage 16.

The front face of the carriage 16 is provided with a disk-shaped support whose axis 46 is shown in FIG. 1. The axis 46 is parallel to the direction X—X. The support extends into a suitable channel of a tool spindle carrier or turret 18 and enables the latter to turn back and forth about the axis 46. The turret 18 supports two bearings 48, 50 for horizontal tool spindles 52, 54. The axes of spindles 52, 54 are located in a vertical plane which is normal to the axis 46 and these spindles face in opposite directions (see FIG. 2) so that one thereof (52) is adjacent to the workpiece. Furthermore, one of the spindles 52, 54 is located at a level above the other tool spindle. Each of the tool spindles 52, 54 is removably received in the respective bearing.

Figure 2:
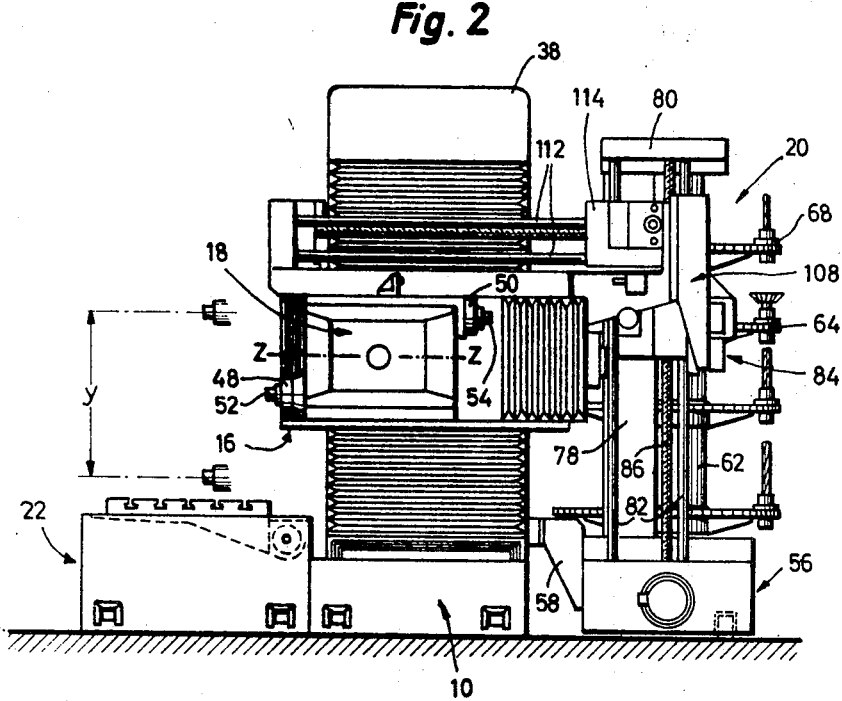
FIG. 2 is a front elevational view of the machine tool as seen from the right-hand side of FIG. 1 but with the instrument panel omitted.

The turret 18 can turn back and forth through 180 degrees about the axis 46, i.e., the tool spindle 52 can take the place of the tool spindle 54 and vice versa. It will be noted that the distance between the axis 46 and the axis of spindle 52 is equal to that between the axis 46 and the axis of the spindle 54. FIG. 2 shows the tool spindle 52 in operative position (at a level below the tool spindle 54). The tool spindle 54 is in a position in which it can receive a fresh tool or in which a tool can be separated therefrom. The spindle 52 carries a milling or boring tool which can treat a workpiece or blank held in position adjacent to the table 24.

The drive means for turning the turret 18 about the axis 46 (i.e., with reference to the carriage 16) comprises a hydraulic motor (not shown) which can be mounted in the turret or in the carriage stops (not shown) are provided to properly locate the turret 18 in each of its end positions.

The machine further comprises a tool magazine 20 having a lower portion 56 which is connected with the column 12 by a coupling element 58 (see FIG. 2). Thus, the magazine 20 shares all movements (X—X) of the column 12 with reference to the bed 10. The design of the coupling element 58 is preferably such that the magazine 20 is free to move up and down with reference to the column 12 or vice versa in a direction at right angles to direction X—X. Thus, and if the path for the magazine 20 is not exactly parallel to the path of the column 12, the latter need not take up additional stresses which would arise if the magazine were rigidly secured thereto. The connection between the column 12 and magazine 20 is rigid insofar as the movement in the direction X—X is concerned.

The lower portion 56 of the magazine 20 supports a tool-accommodating upper portion 60 which comprises a series of superimposed turntables or racks 64 for individual tools. The racks 64 are turnable about the axis of a hollow vertical post 62 (see particularly FIG. 3). In the illustrated embodiment, the post 62 is rotatable with reference to the lower portion 56 and is rigid with the racks 64. Each of these racks has a peripheral surface provided with cutouts or recesses communicating with sockets 66 each of which can accommodate one or more tools. Such tools are preferably received in holders 68 (FIG. 2) having flanges which come to rest on the top surfaces of the respective racks 64. The arrangement is such that the holders 68 can be withdrawn by moving substantially radially outwardly with reference to the respective racks 64. The axes of tools which are accommodated in the sockets 66 are preferably parallel to the vertical axis of the post 62.

The indexing means for the upper portion 60 of the magazine 20 comprises a reversible motor 70 (FIG. 5) which is mounted in the lower portion 56 and is drivingly connected with the lower end portion of the post 62 by way of a transmission including a pinion 72 on the output shaft of the motor 70 and a ring gear 74 fixed to the post and meshing with the pinion 72. A suitable spring-biased detent structure 76 (FIG. 5) is provided to yieldably hold the upper portion 60 of the magazine 20 in selected angular positions in which a tool holder 68 is ready to be removed from or returned to the corresponding rack 64.

Figure 5:
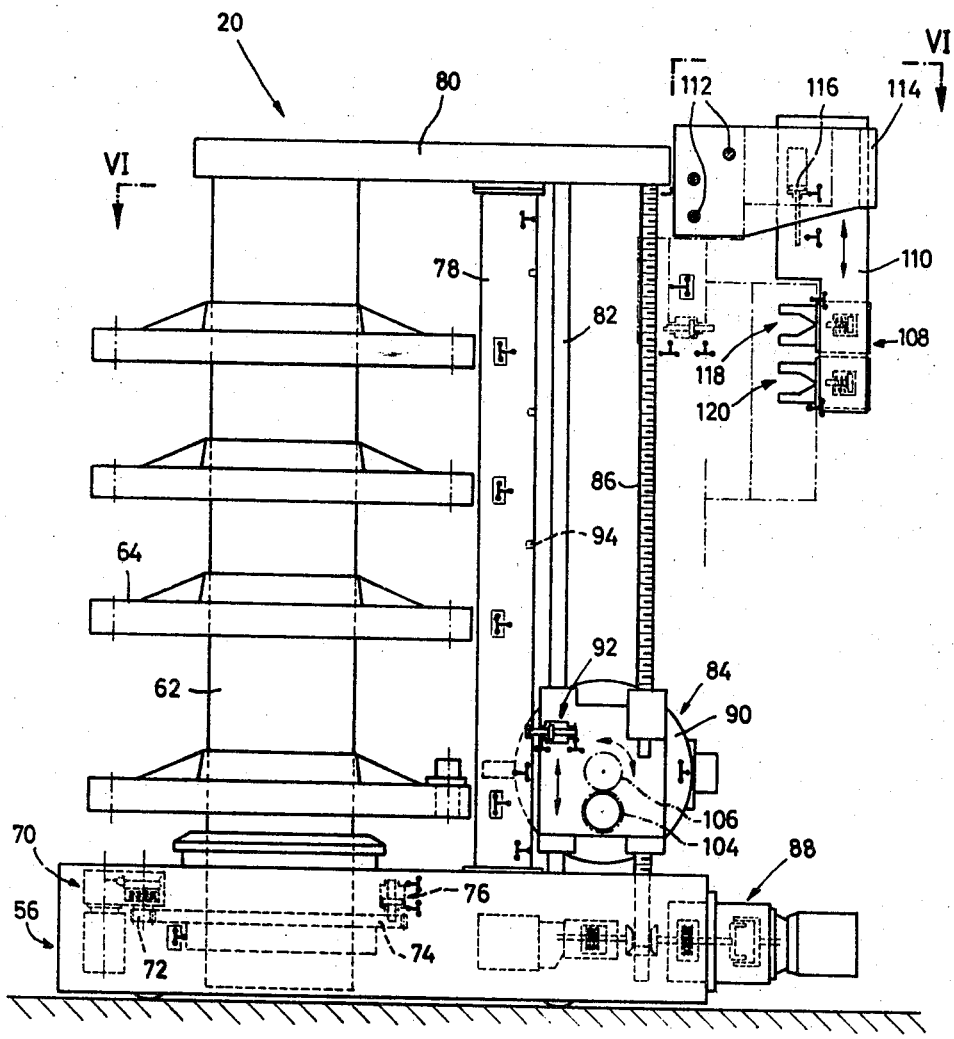
FIG. 5 is an enlarged schematic side elevational view of the magazine and of the transfer mechanism, substantially as seen in the direction of arrow V in FIG. 3.

The racks 64 need not be equidistant from each other. For example, and as shown in FIG. 5, the distance between the two lowermost racks 64 exceeds the distance between the two intermediate racks. The distance between the two uppermost racks 64 of FIG. 5 approximates or equals the distance between the two intermediate racks. The racks 64 are preferably adjustable in the axial and/or circumferential direction of the post 62. Axial adjustability of racks 64 is desirable in order to provide enough room for storage of relatively long tools or tool holders 68. Such adjustability renders it possible to employ a relatively short magazine 20 without reducing its capacity. Due to the fact that the tools are preferably stored in positions in which their axes extend in parallelism with the axis of the post 62, the tools and their holders need not extend beyond the outlines of the respective racks 64 so that the magazine 20 occupies little room as seen in direction at right angles to the post.

A transfer mechanism is provided to move tool holders 68 between the magazine 20 and tool spindle 52 or 54. This transfer mechanism comprises an upright supporting beam 78 which is mounted on the lower portion 56 of the magazine 20 and is adjacent to the upper portion 60. The upper end of the beam 78 is rigid or integral with a crosshead 80 which serves as a bearing for the upper end of the post 62. The lower portion 56 of the magazine 20 further supports a pair of vertical guide rods 82 (FIGS. 2 and 5) for a reciprocable tool changer head 84. The drive for the head 84 comprises a vertical feed screw 86 whose upper and lower ends are respectively rotatable in the crosshead 80 and in the lower portion 56 of the magazine 20 and which is rotatable by a motor assembly 88. The feed screw 86 meshes with one or more spindle nuts of the head 84.

The head 84 includes a platen 90 which is rotatable about a horizontal axis and a detent mechanism 92 for yieldably holding the platen 90 in selected angular positions with reference to one of the racks 64. The detent mechanism 92 comprises a reciprocable locking bolt which can enter one of a row of vertically spaced recesses or notches 94 provided in the supporting beam 78.

Figure 6:
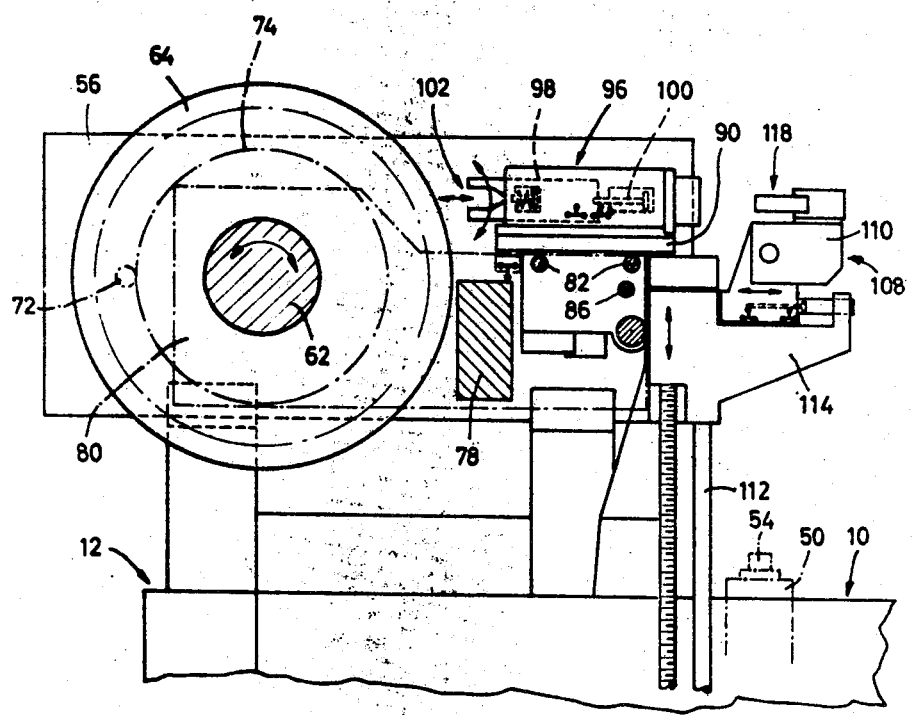
FIG. 6 is a smaller-scale horizontal sectional view as seen in the direction of arrows from the line VI—VI of FIG. 5.

The front face of the platen 90 carries a mobile inverting unit 96 which is rigidly secured thereto. This unit comprises a sleeve for a tool gripper 98 (FIG. 4) which is reciprocable by a hydraulic motor 100 (FIG. 6). The motor 100 is preferably built into or is installed directly in the inverting unit 96. One end portion of the gripper 98 is provided with spring-biased jaws or claws 102. In FIG. 6, the jaws 102 face the magazine 20. If the gripper 98 is moved by motor 100 in a direction to the left, as viewed in FIG. 6, i.e., radially of the axis of the post 62, its jaws 102 can move apart and can grip a tool holder 68 in the adjoining socket 66 of a selected rack 64. The gripper 98 is thereupon withdrawn to remove the selected tool holder from its socket (i.e., the gripper returns to the position shown in FIG. 6) and the platen 90 is subsequently caused to turn by a hydraulic motor 104 (FIG. 5) which drives a gear 106 on the shaft of the platen. The axis of the platen 90 is horizontal and is normal to the axis 46 and to the axis of the gripper 98.

In order to properly orient a tool holder 68 which is held by the jaws 102 so that the tool holder is ready to be transferred to one of the tool spindles 52, 54, the gripper 98 must turn through 90 degrees about its own axis (see the double-headed arrow in FIG. 6). Such turning of the gripper 98 is preferably effected in automatic response to rotation of the inverting unit 96 through 180 degrees, for example, by a system of bevel gears which are not shown in the drawing. The axis of the inverted tool holder is then parallel to the direction Z—Z.

A mobile inserting unit 108 of the transfer mechanism cooperates with the inverting unit 96 and serves to transport tool holders 68 between the jaws 102 of the gripper 98 and the tool spindle 52 or 54. The inserting unit 108 comprises a carriage 110 which is reciprocable along horizontal guide rods 112 (FIG. 2) in parallelism with the direction Z—Z but is not directly connected to such rods. The guide rods 112 are mounted on the slide 14. The carriage 110 is movable along the guide rods 112 with the carriage 16. To this end, the guide rods 112 support a reciprocable bracket 114 which supports the carriage 110 for vertical movement (direction Y—Y). A hydraulic motor 116 is provided to move the carriage 110 up or down between two predetermined positions. The carriage 110 supports two clamping devices or tongs 118, 120 which can assume predetermined positions in response to vertical displacement of the carriage. The clamping devices 118, 120 are disposed one above the other in a common vertical plane. When in the lower end position shown in FIG. 5, the clamping device 118 registers with the tool spindle 54. The clamping device 120 registers with the tool spindle 54 when the carriage 110 is moved to its upper end position (not shown in FIG. 5).

Figure 4:
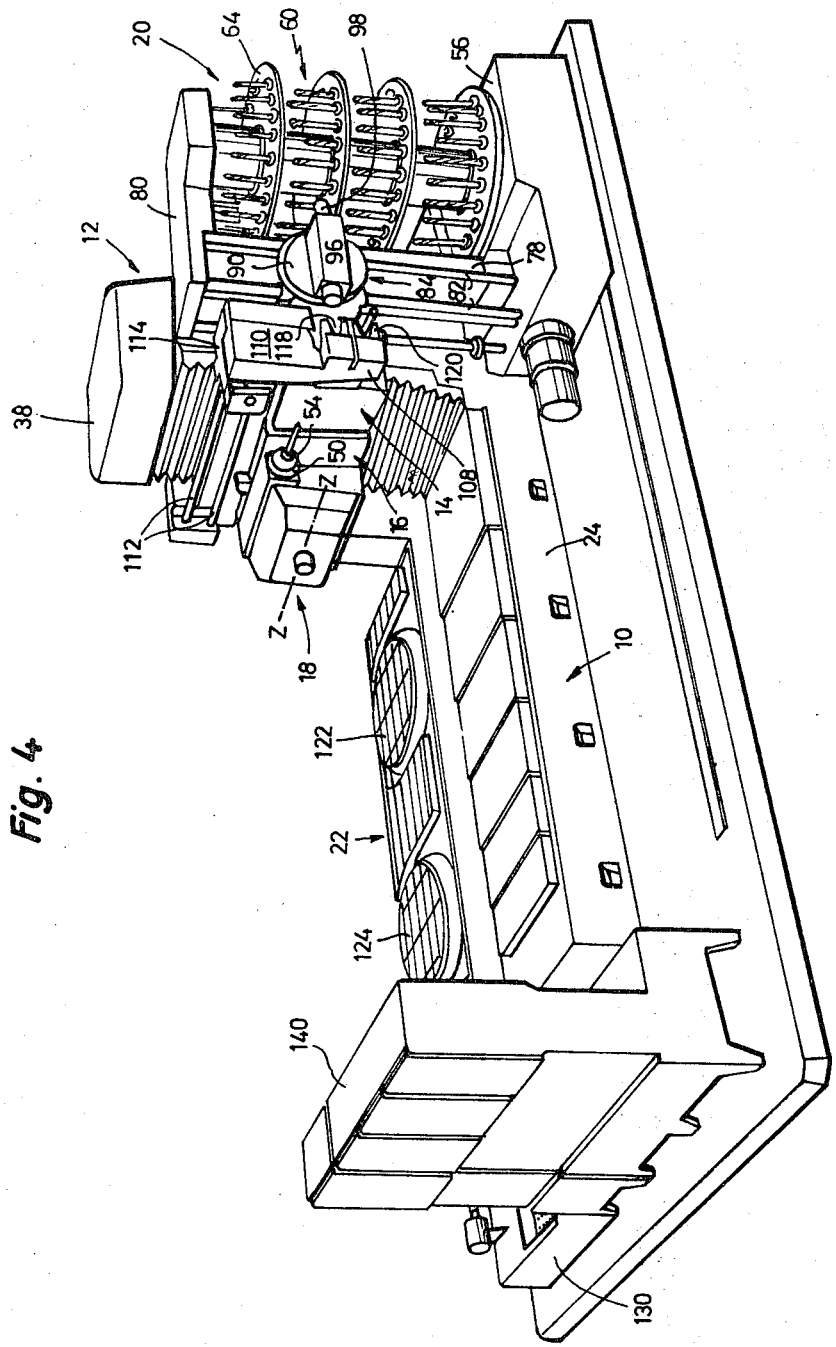
FIG. 4 is a perspective view of the machine tool, substantially as seen in the direction of arrow IV in FIG. 3.

The purpose of the gripper 98 is to turn the tools and their holders 68 90 degrees so as to place the axes of tools into parallelism with the axes of tool spindles 52, 54. This is necessary because the axes of tools stored in the magazine 20 are preferably vertical. The platen 90 effects proper orientation of tool holders 68 with reference to the clamping device 118. namely, it orients the tool holders in such a way that the clamping device 118 grips the working end of a tool and inserts the rear end of such tool into the spindle 52 or 54. Referring to FIG. 4, it will be seen that the working ends of tools in holders 68 extend upwardly. When a tool holder 68 is grasped by the jaws 102 of the gripper 98 and the latter turns by 90 degrees about its own axis, the axis of the tool holder is horizontal and is parallel to the axes of spindles 52, 54. By turning the unit 96 through 180 degrees, the platen 90 causes the working end of the tool held by the gripper 98 to enter the space between the claws of the clamping device 118. This device 118 then moves in the direction Z—Z and inserts the rear end of the tool into the spindle 54.

An exchange of tool holders 68 (including separation of a tool holder from the tool spindle 54 and attachment of a fresh tool holder) is carried out as follows:

When the jaws 102 of the gripper 98 grasp a tool holder 68 which has been removed from one of the sockets 66, the inverting unit 96 is turned by 180 degrees and causes the gripper 98 to turn by 90 degrees about its own axis. The axis of the tool holder 68 which is held by the jaws 102 is then parallel to the direction Z—Z; however, such tool holder can be located at any of several levels, namely, at the level of one of the racks 64 in the upper portion 60 of the magazine 20. Therefore, the head 84 must be moved to a predetermined level with reference to the inserting unit 108. Such movement of the head 84 is effected by the hydraulic motor 88 and the head then assumes the position shown in FIG. 4. The clamping device 118 registers with the tool holder which is held by the jaws 102. The gripper 98 is moved axially by the motor 100 and delivers to tool holder to the clamping device 118. The carriage 110 is then moved with reference to the bracket 114 to its upper end position in which the clamping device 120 register with the tool spindle 54. In the next step, the inserting unit 108 is moved along the guide rods 112 toward the turret 18 and the tool holder held by spindle 54 is released so that it can be engaged by the clamping device 120. The inserting unit 108 is thereupon moved along the guide rods 112 but in a direction away from the turret 18 whereby the freshly withdrawn tool holder remains between the jaws of the clamping device 120. Thus, when the carriage 110 moves away from the turret 18 in parallelism with the axes of tool spindles 52 and 54, each of the clamping devices 118, 120 carries a tool holder. The upper clamping device 118 carries a tool holder which was removed from the magazine 20 and the lower clamping device 120 carries a tool holder which was removed from the tool spindle 54.

The carriage 110 then moves downwardly and thereupon in a horizontal direction (Z—Z) so that the clamping device 118 inserts the fresh tool holder into the tool spindle 54. Such tool holder is then fixedly retained in the spindle 54 and the carrier 110 moves away from the turret 118. The inserting unit 108 then remains in the position shown in FIG. 4 until it becomes necessary to replace the tool holder which is mounted in the spindle 52 or 54.

Prior to a fresh tool change, the platen 90 of the head 84 is turned back by 180 degrees and rotates the gripper 98 by 90 degrees. The head 84 is moved to a desired level along the guide rods 82 to place the gripper 98 into registry with a selected rack 64. A freshly removed tool holder is supplied to the clamping device 118. It is clear that the tool holder held by clamping device 120 is returned into a selected socket 66 prior to a further tool change. The tool holder is returned by way of the gripper 98.

A work supporting means including a platform 22 is adjacent to one side of the bed 10. The platform 22 preferably constitutes a self-supporting assembly which is detachably secured to the bed 10. Two universal work supporting tables 122, 124 of circular outline are mounted on the platform 22 and are spaced from each other in the longitudinal direction of the bed 10. The top faces of the tables 122, 124 can be moved into the plane of the top face of the platform 22. Due to the fact that the machine comprises two work supporting tables 122, 124, two workpieces can be mounted thereon at the same time, i.e., one of the workpieces can be treated by a tool mounted in the tool spindle 52 or 54 while the other workpiece is being mounted on or removed from the other work table. This reduces the length of intervals between treatments of successive workpieces. At least one of the work tables 122, 124 is preferably tiltable about a horizontal axis so that the workpiece mounted on such tiltable table can be formed with inclined bores, cuts, notches, grooves or the like.

Figure 3:
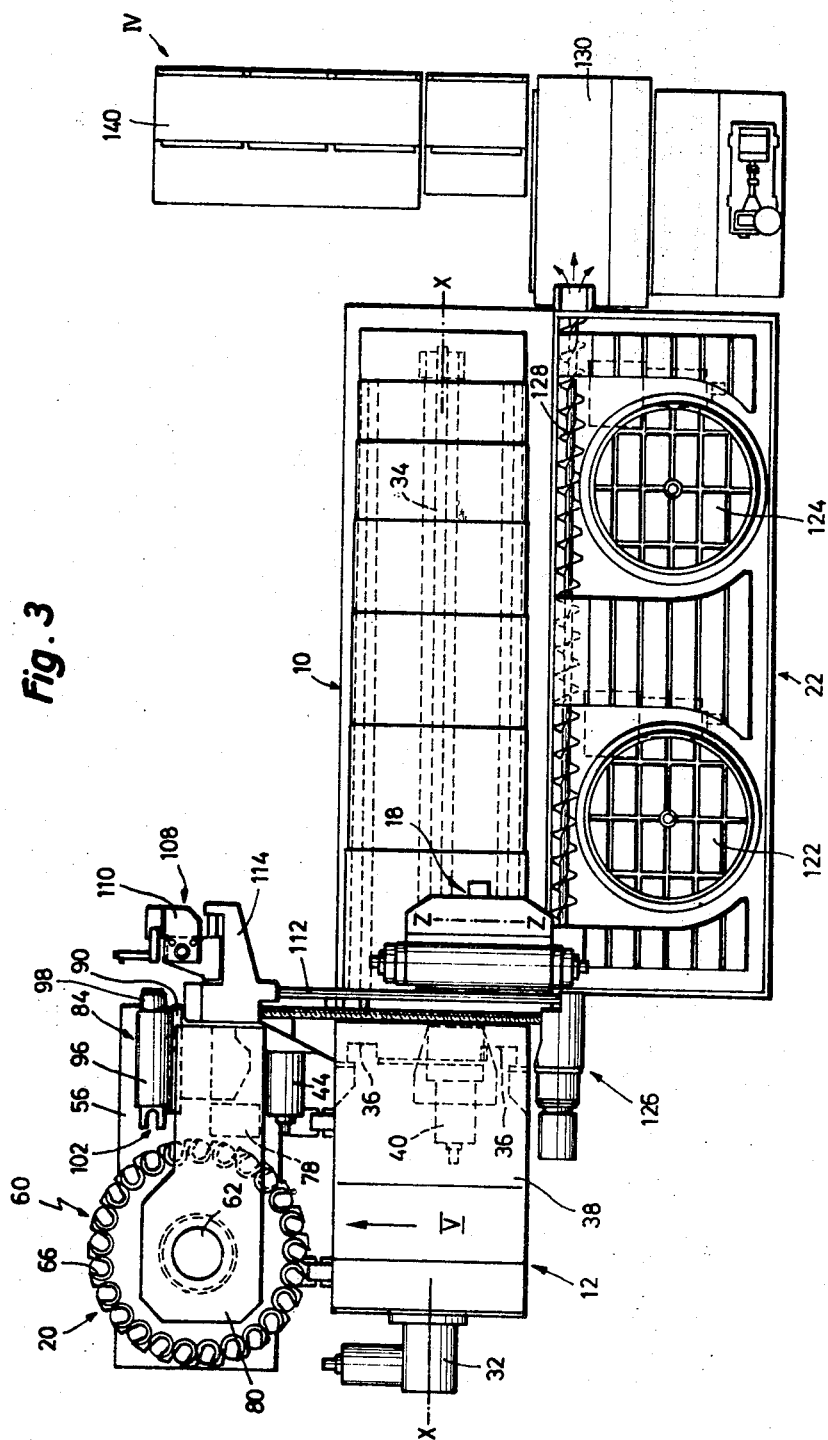
FIG. 3 is a top plan view of the machine tool.

The platform 22 is preferably provided with an automatic chip evacuating assembly which includes a motor 126 for a screw 128 serving to convey chips into a collecting receptacle 130 (see FIG. 3). The numeral 140 denotes an instrument panel.

FIG. 3 shows that the magazine is located at that side of the column 12 which faces away from the platform 22 and that the column 12 is located between the magazine and the main slide 14 as considered in the direction X—X. In other words, the magazine is located behind the slide 14 when the column 12 moves toward the instrument panel 140.

The machine is further provided with a fully automatic or semiautomatic programming system which effects the exchange of tools or tool holder 68 in the aforedescribed sequence and in such a way that a fresh tool is connected to one of the spindles 52, 54 when the other spindle is about to turn with the turret 18 to assume the position occupied in FIG. 2 by the spindle 54. This reduces appreciably the intervals between successive treatments of workpieces.

Additional programming means may be employed to move the slide 14 and carriage 16 as well as to turn the turret 18 and to attach or disconnect tools or tool holders from the tool spindles. Some elements of such programming means are accommodated in or on the panel 140.

If the machine tool is intended for treatment of very long workpieces, the platform 22 supports a single workpiece at a time. As clearly shown in FIG. 3, the platform 22 is positioned in such a way that a long or wide workpiece may extend beyond both longitudinal ends of the platform as well as in a direction away from the base portion 10 and well beyond the platform. Since the spindle 52 and/or 54 can take different types of tools, the workpiece need not be shifted from machine to machine in order to subject it to a drilling operation following a milling operation or vice versa. The magazine 20 may accommodate a supply of thread cutting, tapping, milling, boring, drilling and/or other tools which remove material while the spindles rotate or while the spindles move in the direction X—X, Y—Y or Z—Z. Since the turret 18 supports several tool spindles, the time required to set up the machine for a series of successive operations are very short because a tool carried by the spindle 52 can remove material from a workpiece while the transfer mechanism replaces the tool which was rotated by spindle 54 in the course of the preceding operation, or vice versa. Programming of the mobile units in the transfer mechanism reduces the times required for an exchange of tools so that such exchange can be completed for spindle 54 while a tool in the spindle 52 carries out an operation upon the workpiece supported by platform 22.

The magazine 20 constitutes but one type of magazines which can be used in the machine tool of our invention. However, the magazine 20 has been found to be especially suited for use in our machine tool, particularly in combination with the aforedescribed transfer mechanism, because the gripper 98 can hold a tool holder 68 ready for attachment to the clamping device 118 while the other clamping device 120 holds a tool holder 68 for attachment to the gripper.

It is further clear that the work supporting means of our improved machine tool may include a different platform with or without universal tables thereon. For example, the entire platform 22 may constitute a large universal table which can support a single bulky workpiece at a time and can rotate, swivel, pivot and/or otherwise move in suitable bearings so that it can present two, three, four or more sides of the workpiece to a tool carried by the spindle 52 or 54. The length and/or width of a workpiece on such a platform may be in the range of one or more meters. The work supporting means shown in FIGS. 1 to 6 has been found to be particularly suited for our purposes because one of the tables 122, 124 can support a workpiece which undergoes treatment while the other workpiece may receive, or be relieved of, a workpiece. Transfer of large and/or heavy workpieces to and from proper position in a machine tool often takes up much time.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended.

We claim:

1. A machine tool, particularly a combination milling and boring machine for treatment of bulky workpieces, comprising stationary work supporting means; a frame having a lower portion adjacent to said work supporting means and an upper portion supported by said lower portion for reciprocating movement along said work supporting means in a first direction; a slide mounted on said upper portion for reciprocatory movement in a second direction normal to said first direction; a carriage supported by said slide for reciprocatory movement in a third direction which is normal to said first and second directions; a turret mounted on said carriage and turnable about a predetermined axis parallel to said first direction; and tool spindle means including a pair of tool spindles mounted on said turret and respectively rotatable about axes which are normal to said predetermined axis.

2. A machine tool as defined in claim 1, wherein said pair of tool spindles are located in a plane which is normal to said predetermined axis, said tool spindles facing in opposite directions and said turret being turnable between two end positions in each of which one of said spindles is adjacent to said work supporting means.

3. A machine tool as defined in claim 2, wherein said first and third directions are horizontal directions and said second direction is a vertical direction, said predetermined axis being parallel to said first direction and the axes of said tool spindles being horizontal in each end position of said turret.

4. A machine tool as defined in claim 3, further comprising a tool magazine and a transfer mechanism for transporting tools between said magazine and the other tool spindle.

5. A machine tool as defined in claim 4, wherein said tool spindles are mounted in said turret at the same radial distance from said predetermined axis so that one of the spindles assumes the position of the other spindle in response to turning of said turret from one to the other end position.

6. A machine tool as defined in claim 5, wherein that spindle which is adjacent to said work supporting means is located at a level below the other spindle.

7. A machine tool as defined in claim 4, wherein said transfer mechanism comprises an inserting unit including two tool clamping devices movable between said magazine and said other tool spindle.

8. A machine tool as defined in claim 7, wherein said inserting unit further includes a second carriage supporting said clamping devices, said clamping devices being mounted on said second carriage one above the other in a common vertical plane and said second carriage being movable up and down between two end positions in each of which one of said clamping devices registers with said other tool spindle, said second carriage being further movable in parallelism with the axes of said spindles.

9. A machine tool as defined in claim 7, wherein said inserting unit is movable in synchronism with said turret in each of said first, second and third directions.

10. A machine tool as defined in claim 4, further comprising coupling means connecting said magazine with the upper portion of said frame for movement in said first direction.

11. A machine tool as defined in claim 4, wherein said magazine comprises a plurality of superimposed tool racks indexible about a common vertical axis.

12. A machine tool as defined in claim 11, wherein each of said racks comprises a turntable having a plurality of peripheral sockets each of which can accommodate a tool.

13. A machine tool as defined in claim 12, wherein said turntables include a first turntable, a second turntable located below said first turntable, and a third turntable disposed between and distant from said first and second turntables, the distance between said first and third turntables being different from that between said second and third turntables.

14. A machine tool as defined in claim 12, wherein said sockets are arranged to accommodate tools in positions in which the tool axes are vertical.

15. A machine tool as defined in claim 4, wherein said transfer mechanism comprises a first mobile unit having gripper means for inserting indvidual tools into and for withdrawing individual tools from said magazine and a second mobile unit having clamping means for transporting tools between said gripper means and said other tool spindle.

16. A machine tool as defined in claim 15, wherein said clamping means comprises a first clamping device arranged to transport individual tools from said gripper means to said other spindle and a second clamping device arranged to transport tools from said other spindle to said gripper means.

17. A machine tool as defined in claim 16, wherein said magazine comprises a plurality of tool racks indexible about a common vertical axis and said first unit is movable back and forth radially of and up and down in parallelism with said vertical axis.

18. A machine tool as defined in claim 4, wherein said magazine comprises a lower portion and a tool-accommodating upper portion mounted on said last mentioned lower portion and indexible about a vertical axis, the lower portion of said magazine being adjacent to one side of the upper portion of said frame and further comprising coupling means connecting the lower portion of said magazine with the upper portion of said frame for movement in said first direction.

19. A machine tool as defined in claim 18, further comprising indexing means for the upper portion of said magazine, said indexing means being mounted in the lower portion of said magazine.

20. A machine tool as defined in claim 18, wherein the upper portion of said frame is disposed between said slide and said magazine is considered in said first direction.

21. A machine tool as defined in claim 18, wherein said transfer mechanism comprises a head supported by the lower portion of said magazine for movement in parallelism with said vertical axis, a platen mounted on said head for rotation about a horizontal axis which is normal to said predetermined axis, and a gripper mounted on said platen for rotation about its own axis in response to rotation of said platen about said horizontal axis.

22. A machine tool as defined in claim 21, further comprising drive means for moving said head in parallelism with said vertical axis.

23. A machine tool as defined in claim 4, further comprising coupling means connecting said magazine with said upper portion for movement in said first direction with freedom of movement of said magazine at right angles to said first direction.

24. A machine tool as defined in claim 1, wherein said work supporting means comprises a stationary platform and a plurality of work supporting tables mounted on said platform and spaced from each other as considered in said first direction.

25. A machine tool as defined in claim 24, wherein at least one of said tables is adjustable with reference to said platform.

26. A machine tool as defined in claim 24, wherein said tables are adjustable with reference to said platform, said platform and said tables having top faces and the top faces of said tables being movable into the plane of the top face of said platform.

27. A mchine tool as defined in claim 24, wherein at least one of said tables is tiltable with reference to said platform.

References Cited

UNITED STATES PATENTS

| 1,293,913 | 2/1919 | Potter | 29—38.1 |
| 1,932,546 | 10/1933 | Graves et al. | 90—58X |
| 2,685,122 | 8/1954 | Berthiez | 77—25X |
| 3,232,141 | 2/1966 | Swanson et al. | 77—31 |
| 3,312,370 | 4/1967 | Kolarich et al. | 29—568X |

ANDREW R. JUHASZ, Primary Examiner

Z. R. BILINSKY, Assistant Examiner

U.S. Cl. X.R.

29—54; 77—25; 90—15